United States Patent [19]

Stewart

[11] Patent Number: 5,315,093

[45] Date of Patent: May 24, 1994

[54] MARKET RESEARCH METHOD AND SYSTEM FOR COLLECTING RETAIL STORE MARKET RESEARCH DATA

[75] Inventor: Roy A. Stewart, Bedford, N.Y.

[73] Assignee: A. C. Nielsen Company, Northbrook, Ill.

[21] Appl. No.: 831,770

[22] Filed: Feb. 5, 1992

[51] Int. Cl.$^5$ .......................... G06F 7/08; G06F 15/20
[52] U.S. Cl. ...................... 235/381; 235/375; 235/383; 235/385; 364/402; 364/404
[58] Field of Search ............... 235/375, 381, 383, 385, 235/472; 364/479, 402, 403, 404, 405

[56] References Cited

U.S. PATENT DOCUMENTS

| | | | |
|---|---|---|---|
| 3,651,471 | 3/1972 | Haselwood et al. | 340/172.5 |
| 3,772,649 | 11/1973 | Haselwood et al. | 371/69.1 |
| 3,899,775 | 8/1975 | Larsen | 340/172.5 |
| 4,002,886 | 1/1977 | Sundelin | 235/383 |
| 4,139,149 | 2/1979 | Crepean et al. | 235/383 |
| 4,290,688 | 9/1981 | Call | 355/1 |
| 4,331,973 | 5/1982 | Eskin et al. | 358/84 |
| 4,331,974 | 5/1982 | Cogswell et al. | 358/86 |
| 4,355,372 | 10/1982 | Johnson et al. | 364/900 |
| 4,500,880 | 2/1985 | Gomersall et al. | 340/825.35 |
| 4,521,677 | 6/1985 | Sarwin | 235/383 |
| 4,546,382 | 10/1985 | McKenna et al. | 358/84 |
| 4,588,881 | 5/1986 | Pejas et al. | 235/385 |
| 4,603,232 | 7/1986 | Kurland et al. | 358/84 |
| 4,630,108 | 12/1986 | Gomersall | 358/84 |
| 4,658,290 | 4/1987 | McKenna et al. | 358/84 |
| 4,752,675 | 6/1988 | Zetmeir | 235/375 |
| 4,775,935 | 10/1988 | Yourick | 364/401 |
| 4,825,045 | 4/1989 | Humble | 235/383 |
| 4,833,308 | 5/1989 | Humble | 235/383 |
| 4,872,113 | 10/1989 | Dinerstein | 364/401 |
| 4,907,250 | 3/1990 | Ricks | 364/479 |
| 4,972,504 | 11/1990 | Daniel et al. | 455/2 |
| 4,982,346 | 1/1991 | Girouard et al. | 235/383 |
| 5,111,196 | 5/1992 | Hunt | 235/383 |
| 5,237,157 | 8/1993 | Kaplan | 235/380 |

Primary Examiner—Donald Hajec
Assistant Examiner—Esther Chin
Attorney, Agent, or Firm—Marshall, O'Toole, Gerstein, Murray & Borun

[57] ABSTRACT

A market research system and method are provided. A plurality of cooperating establishments are included in a market research test area. Each cooperating establishment is adapted for collecting and storing market research data. A computer system remotely located from the plurality of cooperating establishments stores a library of bar coded indicia and market research data collected from the cooperating establishments. A unique bar coded indicia is assigned to multiple displays within each of the plurality of cooperating establishments. A corresponding assigned bar coded indicia is applied to the displays within each cooperating establishment.

13 Claims, 4 Drawing Sheets

MARKET RESEARCH METHOD AND SYSTEM FOR COLLECTING RETAIL STORE MARKET RESEARCH DATA

BACKGROUND OF THE INVENTION

1. Field of the Invention

The present invention relates to systems and methods for the collection of market research data from a plurality of cooperating retail stores.

2. Description of the Prior Art

Various arrangements have been employed for the collection, summarization and forwarding of Point-Of-Sale purchasing information from retail stores for purposes of market research since the advent of Point-Of-Sale (POS) optical scanners and the widespread use of the Universal Product Code (UPC) to identify retail products. Typically, retail purchase data is summarized by an in-store POS controller or by a separate store computer attached to the POS controller in the store or, if the store is part of a large retail store chain, by a central or host computer at the headquarters of the retail store chain. The summarized retail purchase data is then typically forwarded to the users of the data by any one of a number of different data storage and transmission techniques, for example, by magnetic tape, disk or diskette, by telephonic data transmission or by over-the-air data transmission.

Known marketing research systems are employed for monitoring television viewing and listening habits of cooperating households and also for such monitoring of individual audience members within the household. The following prior art patents bear at least some relation to one or more of the disclosed features of the present invention:

| INVENTOR(S) | U.S. PAT. NO. | TITLE |
|---|---|---|
| Haselwood et al. | 3,651,471 | DATA STORAGE AND TRANSMISSION SYSTEM |
| Haselwood et al. | 3,772,649 | DATA INTERFACE UNIT FOR INSURING THE ERROR FREE TRANSMISSION OF FIXED-LENGTH DATA SETS WHICH ARE TRANSMITTED REPEATEDLY |
| Larsen | 3,899,775 | AUTOMATIC STORE TRANSACTION SYSTEM AND TERMINAL THEREFOR |
| Sundelin | 4,002,886 | ELECTRONIC PRICE DISPLAY UNIT |
| Crepean et al. | 4,139,149 | DISPLAY SYSTEM |
| Call | 4,290,688 | APPARATUS FOR COLLECTING MARKET SURVEY DATA FROM UNIVERSAL PRODUCT TYPE CODED ITEMS |
| Eskin et al. | 4,331,973 | PANELIST RESPONSE SCANNING SYSTEM |
| Cogswell et al. | 4,331,974 | CABLE TELEVISION WITH CONTROLLED SIGNAL SUBSTITUTION |
| Johnson et al. | 4,355,372 | MARKET SURVEY DATA COLLECTION METHOD |
| Gomersall et al. | 4,500,880 | REAL TIME, COMPUTER-DRIVEN RETAIL PRICING DISPLAY SYSTEM |
| Sarwin | 4,521,677 | PRODUCT CONTROL SYSTEM FOR SUPERMARKETS AND THE LIKE |
| McKenna et al. | 4,546,382 | TELEVISION AND MARKET RESEARCH DATA COLLECTION SYSTEM AND METHOD |
| Pejas et al. | 4,588,881 | SYSTEM FOR MONITORING THE MOVEMENTS OF GOODS INWARDS AND/OR OUTWARDS |
| Kurland et al. | 4,603,232 | RAPID MARKET SURVEY COLLECTION AND DISSEMINATION METHOD |
| Gomersall | 4,630,108 | PREPROGRAMMED OVER-THE-AIR MARKETING RESEARCH SYSTEM |
| McKenna et al. | 4,658,290 | TELEVISION AND MARKET RESEARCH DATA COLLECTION SYSTEM AND METHOD |
| Yourick | 4,775,935 | VIDEO MERCHANDISING SYSTEM WITH VARIABLE AND ADOPTIVE PRODUCT SEQUENCE PRESENTATION ORDER |
| Humble | 4,825,045 | SYSTEM AND METHOD FOR CHECKOUT COUNTER PRODUCT PROMOTION |
| Humble | 4,833,308 | CHECKOUT COUNTER PRODUCT PROMOTION SYSTEM AND METHOD |
| Dinerstein | 4,872,113 | CREDIT CHECK SCANNER DATA ANALYSIS SYSTEM |
| Daniel et al. | 4,972,504 | MARKETING RESEARCH SYSTEM AND METHOD FOR OBTAINING RETAIL DATA ON A REAL TIME BASIS |

The McKenna et al. '382 patent concerns, inter alia, a data collection system for collecting at a central location television viewing data and retail purchase data from a plurality of cooperating households. Each of the households includes a hand held optical scanner for reading bar codes, i.e., UPC codes, associated with retail products purchased by the household. Scanned retail product purchase data and the television viewing data are stored in a common memory in the household and are periodically transmitted by telephone to a central site for processing and market research analysis.

The Eskin et al. '973 patent, the Cogswell et al. '974 patent and the Wright, Jr. '589 patent disclose, inter alia, a market research system utilizing a plurality of cooperating retail stores for obtaining and transmitting to a central location retail product purchase information concerning a plurality of cooperating panelists. The POS scanners in each of the cooperating retail stores scan bar encoded panelist identification cards and the UPC codes on the products purchased by each such panelist. Each retail store's in-store computer then stores a record of the products purchased by each such cooperating panelist, which record is subsequently transferred to a market research company at a remote location for analysis and possible correlation with television viewing data obtained from the same cooperating panelists.

The Gomersall '108 patent is directed to an over-the-air market research system and method and discloses, inter alia, the collection of retail product purchase information from a plurality of cooperating households by means of an UPC scanner provided to each household. Alternatively, such retail product purchase information may be obtained from cooperating retail stores in a test area. Each store's computer stores and periodically forwards a record of the retail products purchased by each cooperating household, identified by a scanned or manually entered identification code for each cooperating household, which information is periodically transmitted by telephone to a central computer for analysis by market researchers. The information transmitted typically includes at least an identification of the cooperating household, an identification of the retail product purchases made by that household and the identification of the retail store transmitting the data. As disclosed in the '108 patent, the data collected, stored and transmitted by each such store may also include the price of each retail product purchased, the date of the purchase and the time of the purchase.

The Larsen '775 patent discloses, inter alia, an automatic store transaction system in which a keyboard is provided at each POS terminal for entering data. A transceiver is also provided at each POS terminal for transmitting data to and receiving data from a central processor. The system is particularly useful for inventory control and for providing data on sales rates and checker productivity.

The Johnson et al. '372 patent, reissued as U.S. Letters Patent No. Re. 31,951, discloses, inter alia, a market research data collection system in which market research data, corresponding to the retail products purchased by a cooperating panelist, is transmitted by telephone from each cooperating household to a remotely located central computer for processing and market research analysis. The data collection system includes a hand held optical scanner located in each household for scanning and storing UPC codes and for entering and storing other related data, for example, the identification of the retail store at which the retail products were purchased.

The Haselwood et al. '471 and '649 patents disclose, inter alia, systems in which a computer at a central location periodically contacts by telephone each of a plurality of remotely located data storage and handling units in a plurality of cooperating households. Television viewing data is then transmitted from the remotely located data storage and handling units to the central location by telephone in the form of frequency modulated audio tones.

The Nickerson et al. '030 patent discloses, inter alia, a television receiver monitoring system for collection data concerning viewing habits and viewing preferences of television viewers located in a plurality of cooperating households and for transmitting that data by telephone to a central location for further processing and analysis. A remote unit in each remotely located cooperating household includes a microprocessor, a control memory, a data store memory and a modem for initiating a telephone call to the central location. The data store memory stores data concerning television channel selection and the times thereof and television viewer reaction. At a preselected time, each such remote unit initiates a telephone call to the central location and transmits the collected data stored in the data store memory by telephone to the central location. During the telephone call, the central location can transmit new control information to each remote unit for storage at the remote unit and for controlling the operation of the remote unit until the time of the next telephone communication between the remote unit and the central location.

The Gomersall et al. '880 patent discloses, inter alia, a computer operated retail pricing display system for displaying pricing and other information in real-time at the shelf or bin location of a product in a retail store.

The Pejas et al. '881 patent discloses, inter alia, an inventory control system having an optical scanner for scanning bar codes associated with particular inventory items.

The Kurland et al. '232 patent discloses, inter alia, a market survey collection and dissemination system that provides for the downloading of survey questionnaires from a central processor by telephone or by a cable television channel.

While many of the above prior art systems and methods constitute significant improvements over prior manual systems and methods of collecting market research data, significant disadvantages exist with respect to many of the above prior art systems and methods. The prior art systems have not effectively monitored causal data for use together with retail sales transactional data. A long-felt want and need has existed for a new and improved market research system and method that monitors and collects causal data for use together with retails sales transactional data without unacceptable time delays while minimizing the time required for collecting the causal data.

SUMMARY

It is an object of the present invention to provide a substantially automated system and method for collecting market research data that includes causal data together with retail sales transactional data.

It is another object of the present invention to provide such market research system and method that overcomes many of the disadvantages of prior art arrangements.

In brief, the objects and advantages of the present invention are achieved by a market research system and method. A plurality of cooperating establishments are included in a market research test area. Each cooperating establishment is adapted for collecting and storing market research data. A computer system remotely located from the plurality of cooperating establishments stores a library of bar coded indicia and market research data collected from the cooperating establishments. A unique bar coded indicia is assigned to multiple displays within each of the plurality of cooperating establishments. A corresponding assigned bar coded indicia is applied to the displays within each cooperating establishment.

BRIEF DESCRIPTION OF THE DRAWING

The present invention together with the above and other objects and advantages may best be understood from the following detailed description of the embodiment of the invention illustrated in the drawing, wherein.

DETAILED DESCRIPTION OF THE PREFERRED EMBODIMENT

Figure 1:
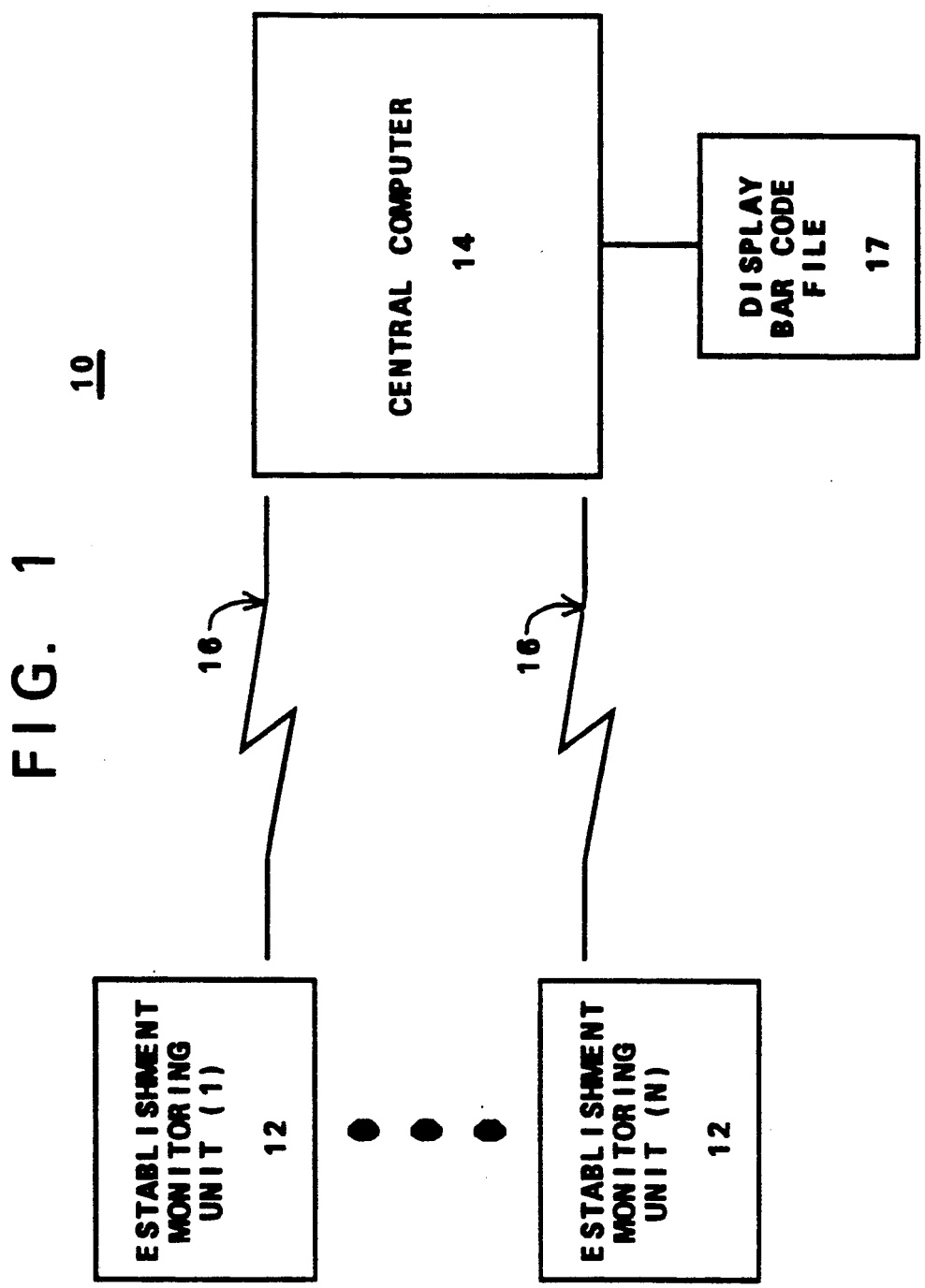
FIG. 1 is a block diagram of a market research system according to the present invention.

Referring now to the drawing, in FIG. 1 there is illustrated a marketing research system generally designated by the reference character 10. Market research system 10 includes a plurality of cooperating establishment monitoring units generally designated by the reference character 12 coupled to a central computer 14 via communications links generally designated by the reference character 16. Each cooperating establishment monitoring unit 12 monitors and stores selected market research data. Various conventional arrangements can be used for the communications links 16, for example, such as, via telephone lines connected to the public switched telephone network.

Central computer 14 collects market research data from the cooperating establishment monitoring units 12. A display bar code file 17 storing a plurality of predefined bar codes representing selected causal data, for example, such as, merchandising units and promotional programs is coupled to the central computer 14 for causal data collection.

Figure 2:
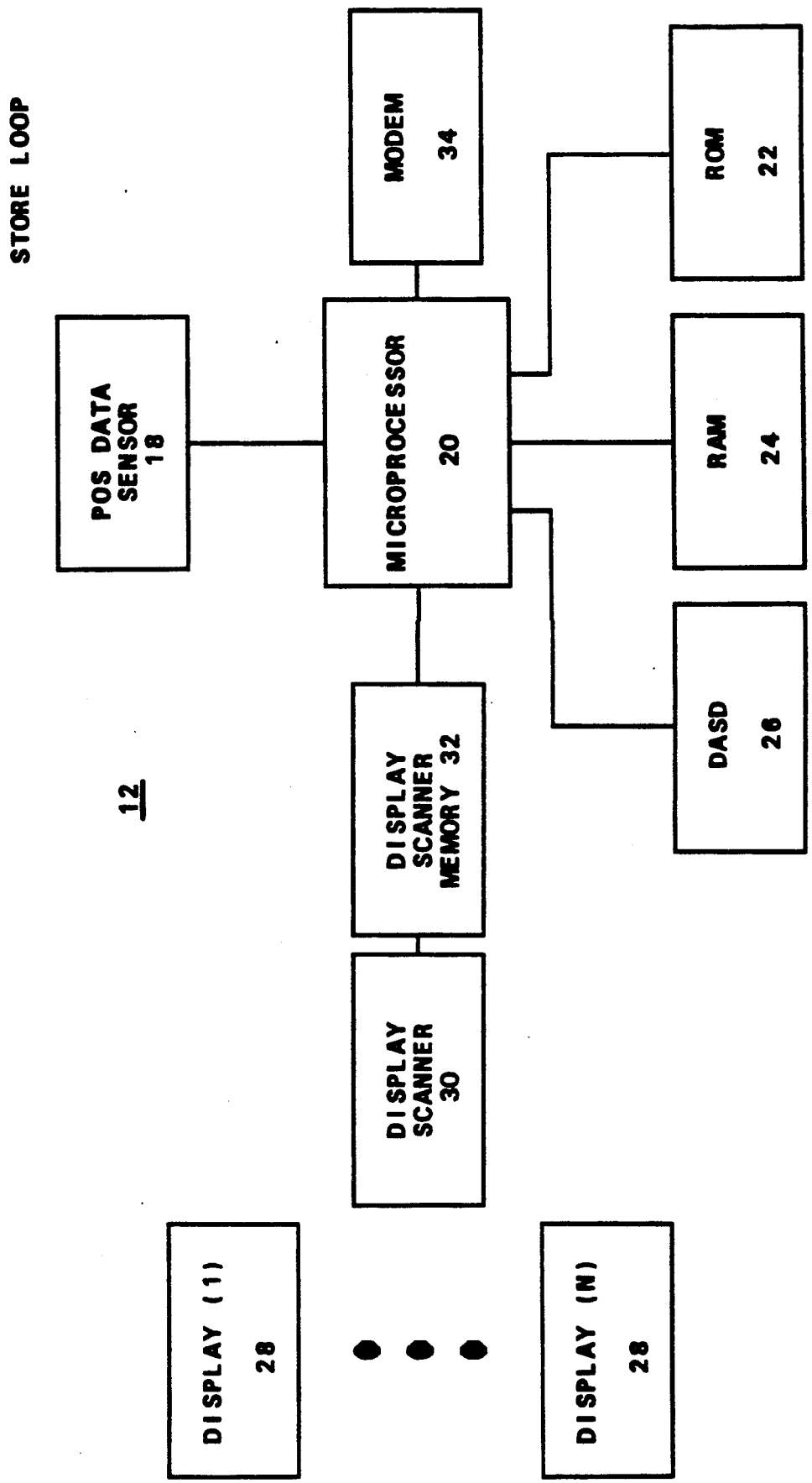
FIG. 2 is an electrical schematic and block diagram representation of a monitoring unit of the market research system of FIG. 1 to perform the method of the present invention.

Referring to FIG. 2, each cooperating establishment monitoring unit 12 is provided with a POS data sensor 18 for monitoring selected operations, such as coupled to a store loop or controller for monitoring multiple POS terminals within a retail store. Sensor 18 formats the collected market research data to provide a first predetermined data format at its output. Sensor 18 is coupled to a processing device 20, such as a microprocessor for processing the formatted operational data. Various commercially available microprocessor devices having standard capabilities can be used for the processing device 20, for example, such as a 80286 high-performance 16-bit microprocessor device manufactured and sold by Intel Corporation of Santa Clara, Calif.

Memory devices including a read only memory (ROM) 22, a random access memory (RAM) 24 and a direct access storage device (DASD) 26 are coupled to the processing device 20 for storing program and processed market research operational data. A plurality of displays 28 illustrated as (1)–(n) carry causal data representative indicia or bar codes that are periodically read by a display scanner 30 and stored in an associated display scanner memory 32.

Collected bar code data stored in the display scanner memory 32 is applied to the processing device 30 to be combined with the collected POS retail sales transactional data. A modem 34 is provided for communications with the central computer 14 via a corresponding communications link 16.

Figure 3:
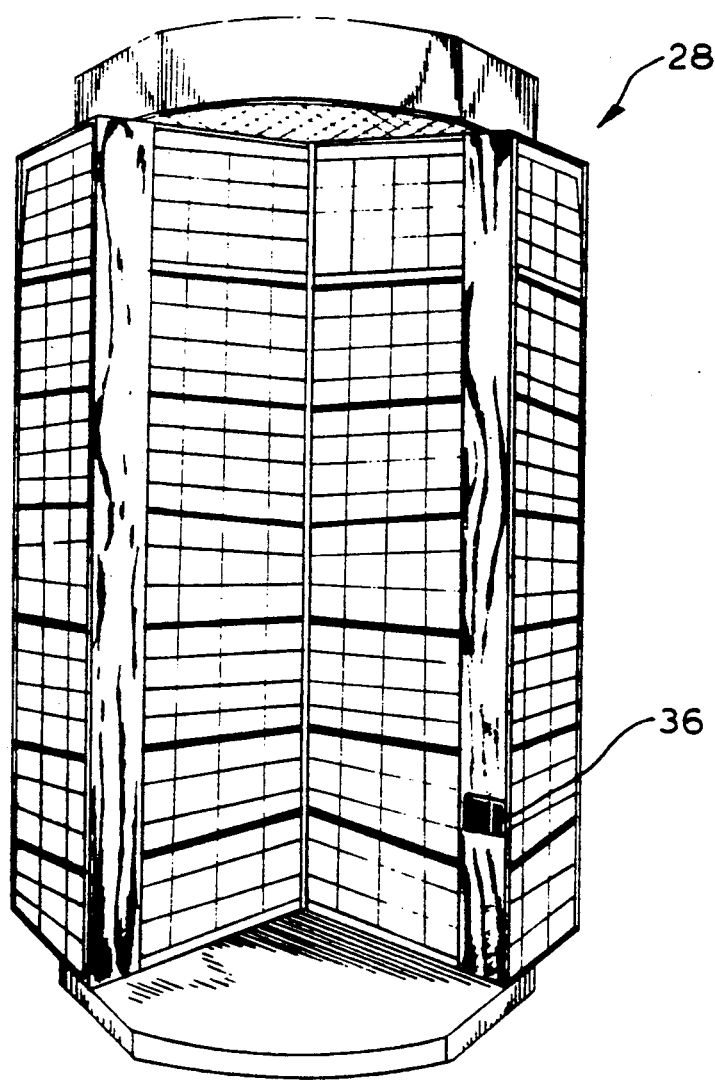
FIG. 3 is a perspective view of a display carrying bar coded indicia representing selected causal data of the market research system of FIG. 1.

Referring to FIG. 3, there is shown as an example a nine-sided centralized merchandiser type of display 28 including a bar code 36. Various types of displays 28 are identified by assigned bar codes 36 that can be printed on labels and fixedly secured, for example with an adhesive to the displays. Each of the bar codes 36 represents selected causal data parameters including, for example, a type of display fixture, total linear feet and number of shelves by fixture, fixture location, a particular manufacturer's promotional program and merchandising configuration. Collected store environmental data represented by the predefined bar codes 36 is electronically captured.

Figure 4:
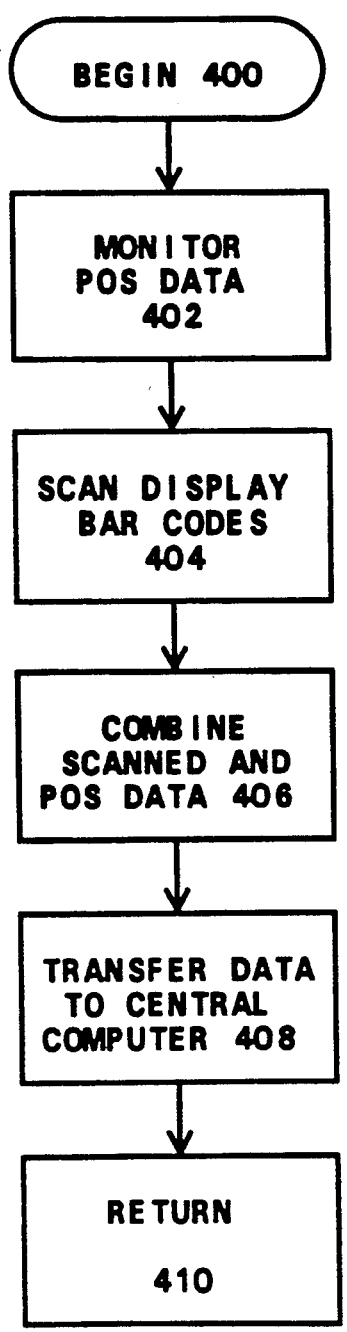
FIG. 4 is a flow chart illustrating logical steps performed by the monitoring unit of the marketing research system of FIG. 1 in accordance with the method of the present invention.

Referring to FIG. 4, there is shown a flow chart illustrating logical steps performed by the monitoring unit 12 of the marketing research system 10. The sequential operations begin at a block 400. Retail sales transaction data is monitored as indicated at a block 402. Periodically the bar coded indicia 36 is scanned from the multiple displays 28 and stored in the display scanner memory 32 as indicated at a block 404. Then the scanned display bar coded indicia data is transferred to a memory device associated with the microprocessor 20 and stored with the monitored POS data as indicated at a block 406. Periodically the collected market research data is transferred from the cooperating establishment monitoring units 12 to the central computer 14 as indicated at a block 408. Then the sequential operations return as indicated at a block 410 to continue monitoring POS data at block 406.

While the invention has been described with reference to details of the illustrated embodiment, these details are not intended to limit the scope of the invention as defined in the appended claims.

I claim:

1. A market research system comprising:
   a plurality of cooperating retail establishments in a market research test area, each cooperating retail establishment having first means for collecting and storing market research data related to point-of-sale retail sales of products displayed by predetermined displays, said first means including means for monitoring said point-of-sale retail sales of products displayed by predetermined displays and means for scanning unique bar coded indicia carried by said predetermined displays within said cooperating retail establishments, said unique bar coded indicia designating selected causal data parameters for each of said predetermined displays; and,
   second means remotely located from said plurality of cooperating retail establishments for receiving and storing said market research data and said unique bar coded indicia.

2. A market research system as recited in claim 1 wherein said bar coded indicia represent a type of display fixture.

3. A market research system as recited in claim 1 wherein said bar coded indicia represent one of a plurality of predetermined fixture locations.

4. A market research system as recited in claim 1 wherein said bar coded indicia represent a particular promotional program.

5. A market research system as recited in claim 4 wherein said bar coded indicia represent a particular merchandising configuration.

6. A market research system as recited in claim 1 wherein said second means remotely located from said plurality of cooperating retail establishments comprises a central computer system.

7. A market research system as recited in claim 6 wherein said central computer system stores a library of digital bar coded indicia and market research data collected from the cooperating retail establishments.

8. A market research system comprising:
a plurality of cooperating retail establishments in a market research test area, each cooperating retail establishment having first means for collecting and storing market research data related to point-of-sale retail sales of products displayed by predetermined displays, said first means including means for monitoring said point-of-sale retail sales of products displayed by predetermined displays and means for scanning unique bar coded indicia carried by said predetermined displays within said cooperating retail establishments, said unique bar coded indicia designating a type of display fixture for each of said predetermined displays; and,
second means remotely located from said plurality of cooperating retail establishments for receiving and storing said market research data and said unique bar coded indicia.

9. The market research system as recited in claim 8 wherein said bar coded indicia represent one of a plurality of predetermined fixture locations.

10. The market research system as recited in claim 8 wherein said bar coded indicia represent a particular promotional program.

11. The market research system as recited in claim 8 wherein said bar coded indicia represent a particular merchandising configuration.

12. The market research system as recited in claim 8 wherein said second means remotely located from said plurality of cooperating retail establishments comprises a central computer system.

13. The market research system as recited in claim 12 wherein said central computer system stores a library of digital bar coded indicia and market research data collected from the cooperating retail establishments.

* * * * *